United States Patent [19]
Mueller, Jr. et al.

[11] 4,062,560
[45] Dec. 13, 1977

[54] HITCH LINK ASSEMBLY

[75] Inventors: Otto Mueller, Jr., Detroit; Dale A. Wood, Canton, both of Mich.

[73] Assignee: Massey-Ferguson Inc., Detroit, Mich.

[21] Appl. No.: 711,342

[22] Filed: Aug. 4, 1976

[51] Int. Cl.² .............................................. B60D 1/00
[52] U.S. Cl. ............................ 280/478 R; 280/460 A
[58] Field of Search ............... 280/477, 478 R, 478 A, 280/461 A, 460 A; 172/272, 439

[56] References Cited

U.S. PATENT DOCUMENTS

| | | | |
|---|---|---|---|
| 2,734,438 | 2/1956 | Todd | 280/477 X |
| 3,084,954 | 4/1963 | Schlueter | 280/478 R X |
| 3,643,976 | 2/1972 | Haupt | 280/478 R |
| 3,853,335 | 12/1974 | Heckenkamp | 280/478 R |

*Primary Examiner*—Joseph F. Peters, Jr.
*Assistant Examiner*—R. Schrecengost
*Attorney, Agent, or Firm*—John C. Thompson

[57] ABSTRACT

An improved hitch link assembly for connecting an implement to a tractor. Each of the draft links of a tractor having a three point hitch includes forward and rear link constructions which are interconnected together in such a manner that the ear link construction can reciprocate with respect to the forward link construction between a rearward position and a forward position and can also swing from a generally horizontal position to an angled position with respect to the forward link construction. The rear link construction is in its normal working position when it is in its rearward position and in its generally horizontal position. In addition, novel engaging means are provided to firmly hold the rear link construction in its normal working position.

9 Claims, 5 Drawing Figures

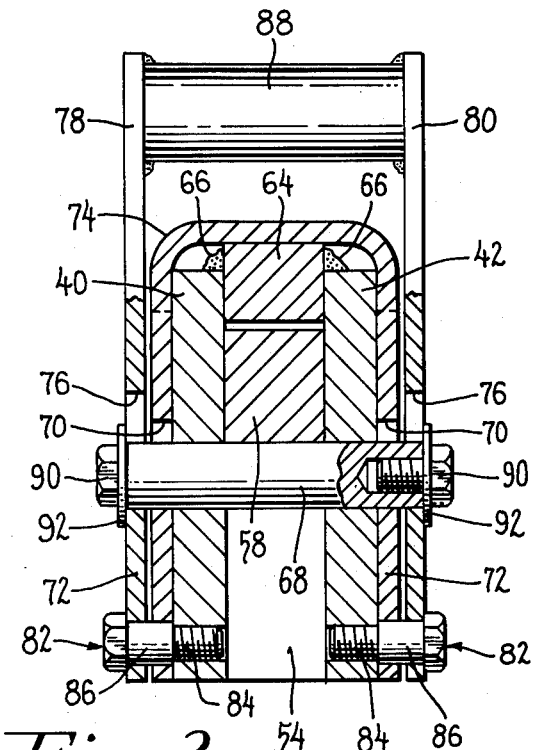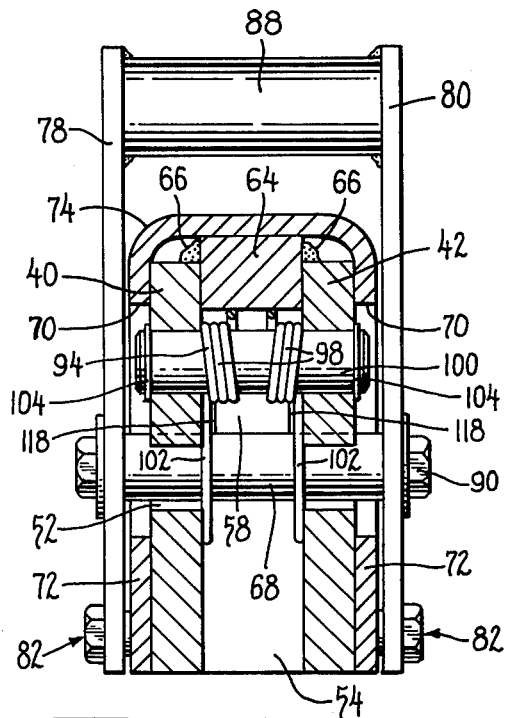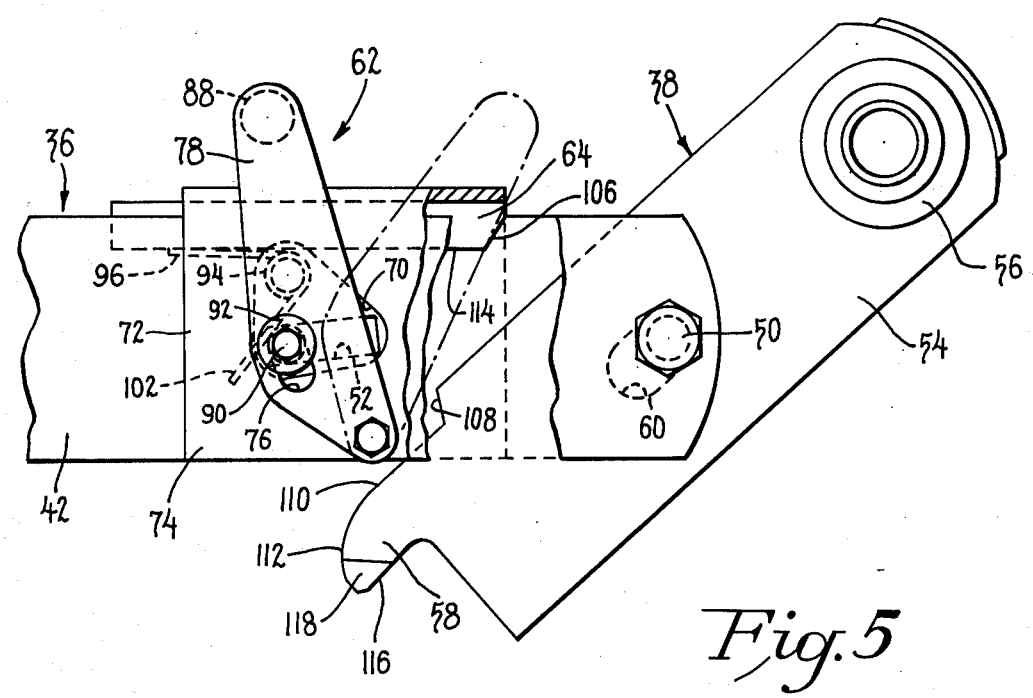

HITCH LINK ASSEMBLY

The present invention relates generally to a tractor hitch for coupling an implement to a tractor, and more particularly to an improved hitch link assembly which permits the hitch link to be readily secured to the hitch pin of an implement.

It is generally conventional to provide agricultural tractors with hitches of a type generally known as a three point hitch. Such three point hitches include a pair of lower rearwardly extending draft links and an upper compression link. Integral, or semi-integral implements may be secured to such hitches. Thus, integral equipment is provided with a pair of laterally spaced apart hitch pins and an upwardly extending mast, the laterally spaced apart hitch pins being secured to the rear ends of the lower draft links of the tractor, and the mast being secured to the upper compression link. Semi-integral equipment is secured merely to the rear ends of the lower draft links of the tractor and thus the upper compression link is not utilized. In either event, it is frequently a difficult and time consuming task to secure the implement to the tractor. Thus, the tractor must be carefully positioned with respect to the implement so that the draft links are aligned with the spaced apart hitch pins on the implement. In order to facilitate the connection of the draft links to the laterally spaced apart hitch pins on the implement it has been proposed in the prior art to provide an articulated draft link construction.

In one such prior art construction, as shown in U.S. Pat. No. 2,734,438 issued Feb. 14, 1956 to E. W. Todd, each of the draft links was provided with a pivoted extension which could pivot about a transversely extending axis. In addition, means were provided to latch the pivoted extension in a normal working position. While this prior art design greatly facilitated the securement of an implement to the draft links of a tractor it had several inherent disadvantages. Thus, there was some vertical end play in the draft link extension which received the hitch pins of the implement. This made it difficult, particularly with wide implements, to maintain the proper attitude and working depth of the implement across the width of the implement. In addition, as the draft link extensions could only pivot with respect to the forward portion of the draft link it was still necessary to move either the tractor or the implement towards or away from the other in order to secure the implement to the draft links.

In a later prior art development, mainly, the draft link construction employed in the Massey-Ferguson 1100 and 1130 tractors, a draft link extension was provided which could not only pivot about the rear end of the forward portion of the draft link, but which could also be moved in a fore and aft direction. In addition, by maintaining very close tolerances of the mating parts it was possible to reduce the vertical end play of the end of the draft link extension as well as to reduce fore and aft end play. However, with this form of construction it was necessary to back the tractor towards semi-integral equipment in order to insure that the draft link extensions were in their latched position. Furthermore, in the commercial form of construction it was necessary to employ machined forgings which greatly increased the cost of the draft links.

It is an object of the present invention to provide an improved hitch link assembly for connecting an implement to a tractor wherein each of the draft links includes a forward link construction, a rear link construction or extension, means for mounting the rear link construction on the forward link construction for reciprocal movement between a rearward position and a forward position and also for pivotal or swinging movement from a generally horizontal position to an angled position when the rear link construction is in its rearward position, the rear link construction being in its normal working position when in its rearward position and generally horizontal position, and also to provide engaging means which will firmly hold the rear link construction in its normal working position.

It is a further object of the present invention to provide an improved hitch link assembly wherein each of the draft links include a forward link construction and a rear link construction mounted for both extensible and swinging movement wherein the rear link construction is normally held in a working position by latch means, in which the latch means can be secured by forward movement of the tractor.

It is another object of the present invention to provide an extensible and articulated draft link extension wherein the draft link extension may be held in its normal operating position with virtually no end play by an improved construction which is of lower cost and is easier to fabricate than known prior art constructions.

These and other objects and advantages of the present invention are accomplished by providing a forward link construction formed of a pair of opposed longitudinally extending members which are provided with a pair of generally cylindrical apertures adjacent the rear ends thereof and a pair of aligned elongated upwardly and rearwardly extending apertures disposed forwardly of the cylindrical apertures, and a rear link construction provided with an elongated slot, the rear link construction being secured to the forward links construction by fastener means which passes through the slot in the rear link construction and the pair of generally cylindrical aligned apertures. The rear link construction is provided with a forward projection which can engage pin means passing through the pair of aligned elongated apertures in the longitudinally extending members of the forward link construction. The pin means is sring biased in a rearward direction and can be moved forwardly by a pivoted latch construction mounted on the forward link. An upper plate extends between the longitudinally extending members. The upper plate member and the rear link construction are provided with a plurality of abutting surfaces that hold the rear link construction firmly in its normal operating position. The forgoing structure will be described in greater detail with reference to the accompanying drawing in which a preferred form of this invention is illustrated.

FIG. 3 is a section taken generally along the lines 3—3 in FIG. 2.

FIG. 4 is a section taken generally along the lines 4—4 in FIG. 2.

FIG. 5 is a view similar to FIG. 2 showing the rear link construction of the hitch link assembly at an angled position, the latching mechanism being shown in full lines in its forward unlatching position and in broken lines in its latching position, parts being broken away for purposes of clarity.

In the description that follows right and left hand reference is determined by standing to the rear of the tractor and facing its direction of travel.

Figure 1:
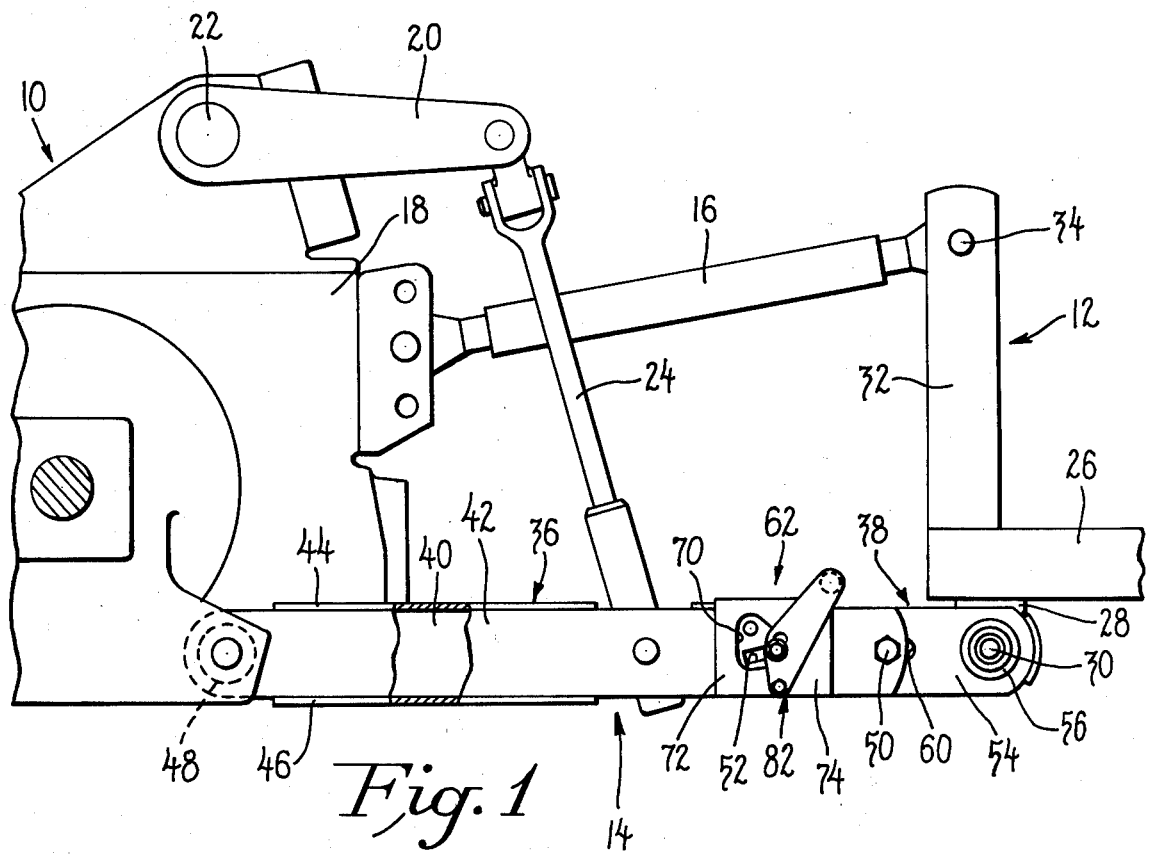
FIG. 1 is a left side elevational view of a portion of an implement and a portion of a tractor provided with the novel hitch link assembly of this invention.

Referring first to FIG. 1, the rear end portion of a tractor, indicated generally at 10, is illustrated, the left rear wheel not being shown for purposes of clarity. In addition, the forward portion of an implement, indicated generally 12, is illustrated. The implement illustrated is of the type generally referred to as an integral implement, but semi-integral implements may also be secured to the novel hitch link assemblies of this invention. The tractor is provided with a pair of lower draft links, only the left one, indicated generally at 14, being illustrated. In addition, the tractor is provided with an upper compression link 16. The forward end of the lower draft link and the upper compression link are both secured to the tractor frame 18 by means well known in the art. In addition, the tractor is provided with a pair of rock arms, only the left rock arm 20 being shown, each of the rock arms being mounted on a rock shaft 22. A pair of lift links, only the left hand lift link 24 being shown, are interconnected with rock arms and extend from the rock arms to the associated draft link. By rotating the rock shaft 22 the lower draft link 14 may be raised and lowered in a conventional fashion. The forward end of the frame 26 of the implement may be provided with a pair of laterally spaced apart downwardly extending brackets 28, each of the brackets carrying a transversely extending hitch pin 30. In addition, the frame 26 supports an upwardly extending mast 32 which may be secured to the rear end of the upper compression link 16 by a pin 34.

Each of the draft links is provided with a forward link construction indicated generally at 36, and a rear link construction indicated generally at 38. The forward link construction includes a pair of opposed right and left hand longitudinally extending members 40, 42, respectively. The side members 40, 42 are secured to each other by upper and lower members 44, 46, respectively, the upper and lower members being welded in place. An apertured ball 48 is carried by the forward end of the forward link construction and is secured in the tractor in a conventional manner. The rear end of the members 40, 42 are provided with aligned apertures. Thus, at the rear end of the members 40, 42 a pair of generally cylindrical apertures (no number) is provided. Fastener means 50 in the form of a nut and bolt assembly pass through said aligned cylindrical apertures. Spaced forwardly of the cylindrical apertures are a pair of aligned elongated upwardly and rearwardly extending apertures 52 the purposes of which will be bought out below.

Figure 2:
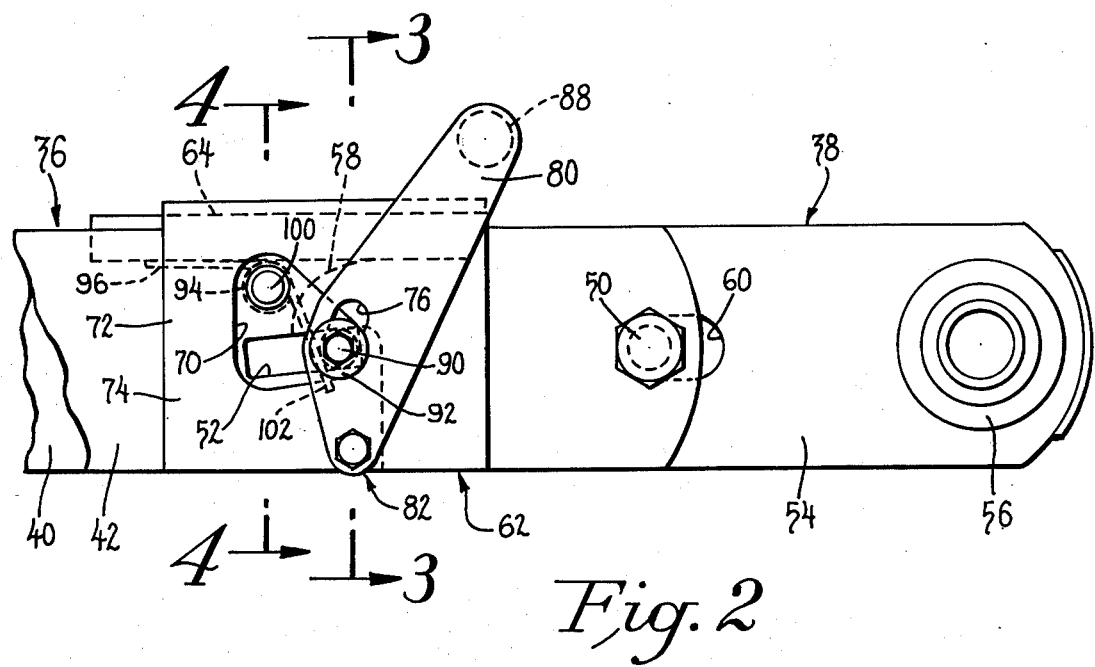
FIG. 2 is an enlarged view of the rear end of the hitch link assembly shown in FIG. 1, the hitch link assembly being shown in its normal working position.

Each of the rear link constructions 38 consists primarily of an elongated member 54 the rear end of which carries an apertured ball 56 which is adapted to receive an implement hitch pin as can be seen in FIG. 1. The forward portion of the elongated member is provided with a forward projection 58. Disposed between the forward portion and the rear end is an elongated slot 60. The fastener means 50 passes through the pair of generally cylindrical apertures (no number) in the right and left longitudinally extendings members 40, 42 as well as the elongated slot 60, these parts acting as mounting means to secure the rear link construction 38 to the forward link construction 36. Thus, the rear link construction is mounted on the forward link construction for reciprocal movement between a rearward position shown in FIG. 2 and forward position as shown in FIG. 5 and also for pivotal or swinging movement from a generally horizontal position as shown in FIG. 2 to an angled position as shown in FIG. 5 when the rear link construction is in its rearward position. The rear link construction is in its normal working position when in its rearward position and generally horizontal position as shown in FIG. 2.

Engaging means are provided for holding the rear link construction in its normal working position, the engaging means including latching means indicated generally at 62 and various abutment surfaces on the elongated member 54 and on plate means 64. The plate means is disposed between the rear ends of the right and left hand longitudinally extending members 40, 42 and is secured in place by welds 66 as can best be seen in FIGS. 3 and 4. The latching means includes pin means in the form of a spacer 68, the opposed ends of the spacer 68 passing through the elongated apertures 52 as well as triangular cutouts 70 on opposed sides 72 of a saddle member 74. The outermost ends of the spacer 68 are received within a pair of aligned slots 76 carried by opposed right and left spaced apart arms 78, 80, respectively, the lower ends of which are secured to the right and left hand longitudinally extending members 40, 42 by suitable pivot means indicated generally at 82. As can best be seen in FIG. 3 each of the pivot means includes a bolt 84 and a spacer 86. The upper end of each of the spaced apart arms are interconnected to each other by suitable handle means 88 which is secured in place in any conventional manner as for example by welding. The right and left arms 78, 80 and the handle means 88 form lever means which are utilized to move the pin in a forward direction. The pin means or spacer 68 is held within the slot 76 of the arms 78 and 80 by bolts 90 and washers 92 as can best be seen from FIG. 3. When the lever means 78, 80, 88 is moved from the position shown in FIG. 2 to the position shown in full lines in FIG. 5 the pin means 68 will be moved forwardly and downwardly as it rides within the elongated apertures 52 until it obtains its forward position shown in FIG. 5. At this point, as the pin means 68 will be forward of the forward projection 58, the rear link construction will be free to pivot to the angled position shown in FIG. 5 and it can be reciprocated towards and away from the tractor. Once the handle 88 is released it will be biased in a rearward direction by spring means 94, the spring means 94 including a bright portion 96 which will normally bear against the forward undersurface of the plate means 64, coils 98 disposed about a pin 100, and downwardly extending tangs 102 which will bear against the spacer 68 to force it in a rearward direction. The pin 100 is received with suitable aligned apertures in the right and left hand longitudinally extending members 40, 42 and is held in place by suitable retainers 104.

In order to minimize end play of the ball 56 at the end of the rear link construction 38, so as to insure that a proper working position of an implement is maintained, it is necessary that various surfaces be in abutting relationship to each other when the rear link construction is in its normal working position, these various surfaces acting as restraining means. Thus, the rear edge of the plate means 64 is provided with first abutment surface means 106 (FIG. 5) which surface cooperates with a second abutment means 108 on the elongated member 54. When the rear link construction is in its normal working position shown in FIG. 2 the first and second abutment surfaces 106, 108 will be in contact with each other. In addition, the fastener means 50 will be disposed at the forward end of the elongated slot 60. Therefore, it will not be possible for the rear link construction to move in a fore and aft direction. In addition, in order to eliminate any vertical end play of the ball end of the rear link construction it is necessary that various horizontal surfaces be in contact with each other. Thus, the forward projection is provided with third abutment surface means 110 between a forward cam surface 112 and the second abutment surface means 108. The third abutment surface means will contact fourth abutment surface means 114 on the lower rear surface of the plate means 64. The lower surface of the forward projection 58 is also provided with fifth abutment surface means 116 which contact the upper surface of the spacer 68. As the spacer 68 will ride in an upwardly and rearward direction within the slot 52 as it is rearwardly biased by the tangs 102 of the spring means it can be seen that the forward projection 58 will be securely confined between the plate means 64 and the spacer 68 to prevent any vertical end play.

In operation, in order to secure an implement to a tractor it is first necessary for the tractor operator to back the tractor towards the implement until the balls 56 are in close proximity to the hitch pins 30. At this point, the tractor operator will then dismount from the tractor and by swinging the handle 88 in a forward direction to the full line position shown in FIG. 5 he can release the rear link construction so that it can be properly positioned for reception of the pins. Once the handle has been released it will return to its normal position shown in broken lines in FIG. 5. After the pins 30 have been received within the ball 56 and properly secured thereto it is then only necessary for the tractor operator to remount the tractor, raise the lift links, and move the tractor forward an inch or two. This will cause the rear link construction 38 to pivot in a clockwise direction when viewed as from FIG. 5, and also to cause the fastener means 50 to move to the forward end of the slot 60. As this happens the cam surface 112 will contact the rear surface of the spacer 68 to cam the lever forward until the forward lower corner of the projection 58 has passed over the pin means or spacer 68, at which time the spring will then bias the pin to a rearward position as shown in FIG. 2. It should be noted that the forward projection 58 is provided with spaced apart notched portions 118 to permit the tangs 102 to pass to either side of the forward projection 58 to insure that the spacer 68 is moved as far to the rear as possible.

The foregoing construction eliminates many of the disadvantages of the known prior art, facilitates connection of the implement to the tractor, reduces machining, and provides for a lower cost construction.

While a preferred embodiment of the present invention has been shown and described below, it is to be understood that the invention is not to be limited to the particular details of the structure shown and described, but that, in fact, widely differing means may be employed in the practice of the broader aspects of this invention.

What is claimed is:

1. A hitch link assembly for connecting an implement (12) to a tractor (10) characterized by the provision of:
    a forward link construction (36);
    a rear link construction (38) having a forward projection (58);
    mounting means (50, 60) for mounting the rear link construction on the forward link construction for reciprocal movement between a rearward position and a forward position and for pivotal movement from a generally horizontal position to an angled position when the rear link construction is in its rearward position, said rear link construction (38) being in its normal working position when in its rearward and generally horizontal position; and
    engaging means (58, 62, 84, 110, 116) operable to firmly hold said rear link construction in its normal working position, the engaging means being engageable with upper and lower surfaces (110, 116) of the forward projection (58) of the rear link construction (38) to firmly hold the rear link construction (38) from pivotal movement when it is in its normal working position, said engaging means further including latching means (62) having transversely extending pin means (68) moveable in an upward and rearward direction into contact with said lower surface (116).

2. The hitch link assembly set forth in claim 1 in which the rear end of the forward link construction is provided with a pair of aligned elongated apertures (52), the latching means (62) being mounted on the rear end of the forward link construction adjacent said pair of aligned elongated apertures, said pin means (68) passing through said pair of aligned elongated apertures, and lever means (78, 80, 88) engaging said pin means.

3. The hitch link assembly set forth in claim 2 wherein said lever means includes spaced apart arms (78, 80), pivot means (82) to pivotally secure the spaced apart arms to opposed sides of the forward link construction, said spaced apart arms being provided with aligned slots (76) which receive said pin means, and handle means (88) extending between the end of the spaced apart arms at a location remote from said pivot means.

4. The hitch link assembly set forth in claim 2 in which said latching means further includes spring means (94) operable to bias said pin means in one direction.

5. The hitch link assembly set forth in claim 1 in which said forward link construction includes a pair of opposed longitudinally extending members (40, 42), said members being provided with a pair of generally cylindrically aligned apertures adjacent the rear ends thereof, in which the rear link construction includes an elongated member (54) provided with an elongated slot (60), and in which the mounting means includes fastener means (50) passing through said pair of generally cylindrical aligned apertures and said slot (60).

6. A hitch link assembly as set forth in claim 5 in which the engaging means includes restraining means (64, 106, 108) to restrain the rear link construction from fore and aft movement when the rear link construction is in its normal working position, said restraining means including plate means (64) extending between said pair of opposed longitudinally extending members (40, 42), said plate means being provided with first abutment surface means (106) on its rear edge, and wherein the rear link construction (38) is provided with second abutment surface means (108) engageable with said first abutment surface means (106) when the rear link construction is in its normal working position.

7. The hitch link assembly set forth in claim 6 in which the a forward projection (58 is part of the elongated member, the forward projection being provided with a cam surface (112), and upper surface (110) being between the cam surface (112) and the second abutment surface means (108), said plate means (64) being provided with further abutment surface means (114) on its lower surface, said upper surface and further abutment surface means (110, 114) being in engagement with each other when the rear link construction (38) is in its normal working position.

8. The hitch link assembly set forth in claim 7 in which the rear end of the forward link construction is provided with a pair of aligned upwardly and rearwardly extending apertures (52), and in which the engaging means includes latching means (62) engageable with the forward porjection (58) of the elongated member (54), the latching means (62) being mounted on the rear end of the forward link construction (36) adjacent to said apertures, said pin means (68) passing through said apertures (52), and lever means (78, 80, 88) engaging said pin means, said pin means in turn engaging the lower surface (116) on the forward projection (58) of said elongated member (54).

9. The hitch link assembly set forth in claim 8 further characterized by the provision of spring means (94) operable to bias said pin means (68) in a rearward direction to force the upper and lower surfaces (110, 114) into engagement with each other.

* * * * *